United States Patent [19]
Hill et al.

[11] Patent Number: 5,536,387
[45] Date of Patent: Jul. 16, 1996

[54] SILVER REMOVAL

[75] Inventors: Michael R. H. Hill, Wantage; Mark D. Neville, Stanford-in-the-Vale; Andrew D. Turner, Abingdon, all of United Kingdom

[73] Assignee: United Kingdom Atomic Energy Authority, Didcot, United Kingdom

[21] Appl. No.: 428,457

[22] Filed: Apr. 27, 1995

[30] Foreign Application Priority Data

May 6, 1994 [GB] United Kingdom .................... 9409194
Mar. 22, 1995 [GB] United Kingdom .................... 9505776

[51] Int. Cl.$^6$ .................................................. C02F 1/463
[52] U.S. Cl. ......................... 205/494; 205/747; 205/750; 205/751; 205/770; 204/264
[58] Field of Search .................................. 204/109, 151, 204/182.4, 264

[56] References Cited

U.S. PATENT DOCUMENTS

| | | | |
|---|---|---|---|
| 3,925,175 | 12/1975 | Fisch et al. ........................... | 204/109 |
| 4,036,715 | 7/1977 | Baden et al. ........................... | 204/109 |
| 4,089,760 | 5/1978 | Ono ........................................ | 204/109 |

Primary Examiner—Arun S. Phasge
Attorney, Agent, or Firm—William R. Hinds

[57] ABSTRACT

Effluent streams from photographic processes contain both silver and thiosulphate ions, and because of the formation of complex anions it is difficult to remove the silver. The silver may be removed using a cell (12) with a cathode (24) exposed to the effluent liquid, and an anode (25) separated from the liquid by a barrier (22) permeable at least to anions. Some silver sulphide is formed electrochemically at the cathode (24); at the anode (25) water is electrolysed and becomes acidic, so the complex anions migrating through the barrier (22) generate silver sulphide chemically. The resulting silver sulphide precipitate is separated from the liquid by a filter (14).

9 Claims, 1 Drawing Sheet

SILVER REMOVAL

This invention relates to an apparatus and to a method for removing silver from a liquid, for example for removing silver from an effluent stream, particularly but not exclusively an effluent stream from a photographic processing plant containing both silver ions and thiosulphate ions.

One method of treating such an effluent stream, described in WO 92/01635 (Kodak), involves contacting the stream with a protonated ion exchange resin while adding acid to maintain the pH below 5. The sulphur oxyanions (such as thiosulphate) are converted into elemental sulphur and sulphate ions, and the resin may absorb silver sulphide. Removal of silver from such an effluent to levels below 0.1 ppm (parts per million) is difficult because of the formation of complexes between silver ions and thiosulphate ions, and known processes produce an acidic effluent which requires further treatment.

One method for the electrochemical removal of ions from aqueous solutions and onto ion exchange materials may be referred to as electrochemical ion exchange or electrochemical deionisation; the method is described for example in UK patents GB 2 187 761 B, GB 2 240 551 B, GB 2 244 281 B and GB 2 244 282 B. It involves establishing an electrochemical cell comprising an aqueous solution as electrolyte, a working electrode and a counter electrode immersed in the electrolyte, where at least the working electrode incorporates an ion absorbing material such as an ion exchange resin in particulate form with a binder, and applying a d.c. voltage between the electrodes. For example, to remove cations from an aqueous solution, the working electrode incorporates a cation responsive ion exchange material and is made the cathode. One view of the mechanism is that at the electrode hydroxyl ions are generated by electrolysis of water, locally changing the pH, and the hydroxyl ions in turn produce active sites in the ion exchange material for absorption of cations from the aqueous solution; an alternative view of the mechanism is that hydrogen ions are displaced from the ion exchange material by cations from the aqueous solution, and diffuse through the ion exchange material to the vicinity of the electrode where they are discharged. Subsequent reversal of the voltage enables the absorbed ions to be eluted so that the working electrode can readily be regenerated. The working electrodes are permeable.

According to the present invention there is provided a method of treating a liquid containing silver and thiosulphate ions, the method comprising causing the liquid to flow through an electrochemical cell, the cell comprising a cathode, an anode, and a barrier to impede at least partially transfer of the liquid from the vicinity of the Cathode to the vicinity of the anode, the barrier being permeable at least to anions, substantially all the liquid being caused to flow in the vicinity of the cathode, applying a potential difference between the anode and the cathode, and separating silver sulphide precipitates from the liquid after its passage through the cell, liquid from the vicinity of the anode being subjected to an operation selected from the group consisting of (a) being mixed with liquid which has flowed in the vicinity of the cathode, prior to separation of the precipitates, and (b) being supplied to the vicinity of the cathode.

The invention also provides an apparatus for performing this method.

Preferably at least 90% of the liquid flows in the vicinity of the cathode, more preferably at least 95%. In one example liquid can reach the anode only by transfer from the vicinity of the cathode, for example by permeating through the barrier. Preferably liquid from the vicinity of the anode is subsequently mixed with liquid which has flowed in the vicinity of the cathode. This enables the overall change of pH of the liquid stream to be minimized.

The barrier might be a mechanical barrier, such as a stack of sheets of non-woven inert material, which impedes mixing of the liquid around the anode with the liquid around the cathode, so that the anodic liquid tends to become acidic due to electrolysis. At another extreme the barrier might be an anion-selective electrodialysis membrane, which is substantially impermeable to water, substantially the only water to pass through it being the water of hydration of those anions which it allows to pass. The preferred barrier is a layer of particulate anion-exchange material bound together by a binder to form a water-permeable coherent structure, as used in a working electrode of an electrochemical ion exchange cell; the anode itself may be a permeable conductor embedded in the barrier layer. The layer might be between 2 and 50 mm thick, typically between 5 and 10 mm thick, and of permeability in the range 25 to 150 liters $m^{-2}h^{-1}$, typically about 50 to 80 liters $m^{-2}h^{-1}$, formed of particulate anion-exchange material of particle size usually in the range 50 μm to 2 mm, typically about 100 μm, with a binder which does not fill the interstices. Such a barrier layer may be close-fitting within a housing, to impede flow of liquid to the anode, or might be sealed around its edge (for example with a gasket) to a housing, so that only liquid which permeates through the layer can reach the anode. The above values of permeability are those as observed in an operating cell, that is to say with a pressure difference across the layer of less than 1 m of water (10 kPa).

BRIEF DESCRIPTION OF THE DRAWINGS

The invention will now be further described by way of example only and with reference to the accompanying drawings, in which:

Referring to FIG. 1 an apparatus 10 for treating a liquid effluent from a photographic process comprises a cell 12 and a filter 14 (shown diagrammatically). The liquid initially contains silver ions and thiosulphate ions; it can be expected to also contain silver thiosulphate complex anions $[Ag(S_2O_3)_2]^{3-}$, and other thio-oxy-anions such as tetrathionate $S_4O_6^{2-}$. The liquid is caused to flow through the cell 12 and then the filter 14, the flow paths being indicated diagrammatically and the pumps not being shown.

Figure 1:
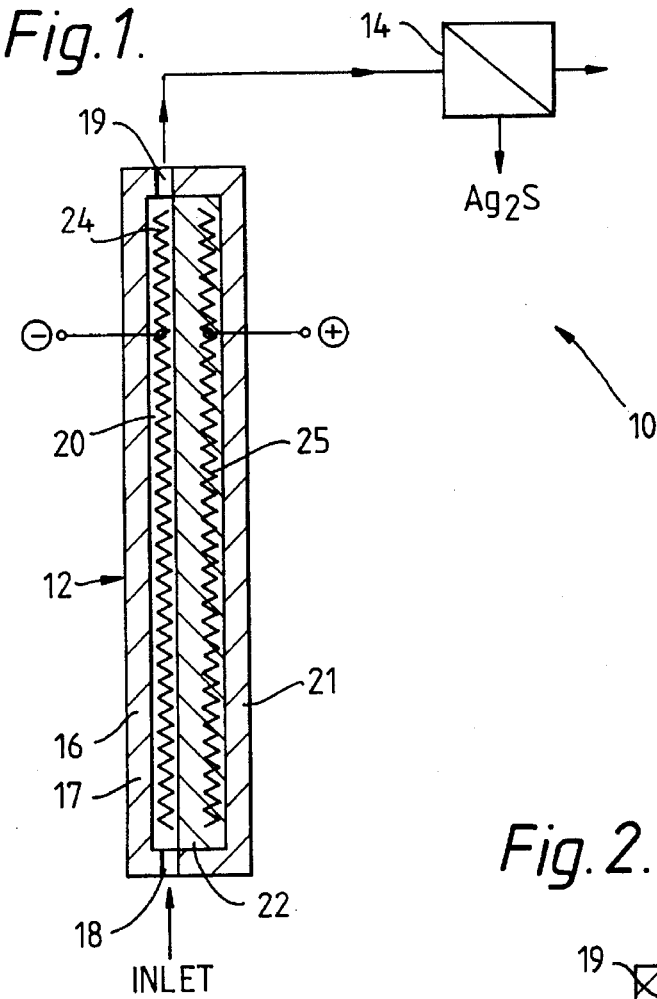
FIG. 1 shows a view, partly in cross-section, of a liquid treatment apparatus.

The cell 12 includes a two part rectangular casing 16, one part 17 of the casing 16 defining an inlet port 18 at the bottom (as shown) and an outlet port 19 at the top, between which is a rectangular flow path 20. The flow path is about 340 mm tall, 5 mm wide (in the plane of the Figure), and 65 mm broad. The other part 21 of the casing 16 defines a rectangular cavity in which fits a 7 mm thick rectangular layer 22 of permeable ion exchange material. The cell 12 includes two electrodes 24, 25, each of corrugated, platinised-titanium mesh, one of which is in the flow path 20 (cathode 24) and the other of which is embedded at the rear face of the layer 22 (anode 25). The anode 25 and the cathode 24 are connected to a suitable power supply (not shown). The layer 22 is cast in situ from an intimate mixture of, for example, Amberlite IRA 910 strongly-basic anion-exchange resin (Rohm & Haas) of particle size 100 μm along with a solution of binder in a solvent (e.g. butadiene/styrene copolymer elastomer dissolved in 1,1,1, trichloroethane), so that once the solvent has evaporated there is only a narrow gap, typically about 0.1 mm, between the layer 22 and the part 21 of the casing 16.

In operation the liquid flows up the flow path 20, and permeates the layer 22; there is some flow of liquid around the edge of the layer 22 between its rear surface and the flow path 20, but this is inhibited by the narrowness of the gap. The liquid is found to emerge from the cell 12 at about pH 6.5, with a very low concentration of dissolved silver, typically less than 0.1 ppm, the bulk of the silver being in the form of insoluble particles of silver sulphide. These are separated from the liquid by the filter 14. The apparatus 10 can operate continuously for days on end. It has been found beneficial to reverse the polarity for a brief period of for example one, hour after every two weeks of continuous operation, to clean any deposits of silver sulphide off the surface of the cathode 24.

It is believed that the principal reaction mechanisms are the following. At the cathode 24:

$$4Ag^+ + S_2O_3^{2-} + 3H^+ + 8e^- \rightarrow 2Ag_2S + 3OH^-$$

$$H_2O + e^- \rightarrow OH^- + \tfrac{1}{2}H_2$$

At the anode 25 water is electrolysed, making the solution acidic in the vicinity of the anode 25:

$$4H_2O \rightarrow 8e^- + 2O_2 + 8H^+$$

If these were the only reactions, it will be appreciated that the overall result would be that the liquid would become acidic. In addition, however, anions such as the silver thiosulphate complex migrate through the layer 22. At the rear surface of the layer the complex is decomposed by the locally acidic environment, precipitating silver sulphide:

$$2[Ag(S_2O_3)_2]^{3-} + H^+ \rightarrow Ag_2S + HSO_3^- \text{ etc}$$

(the exact equation is not known), and also the thiosulphate will decompose:

$$S_2O_3^{2-} + H^+ \rightarrow S + HSO_3^-$$

Figure 2:
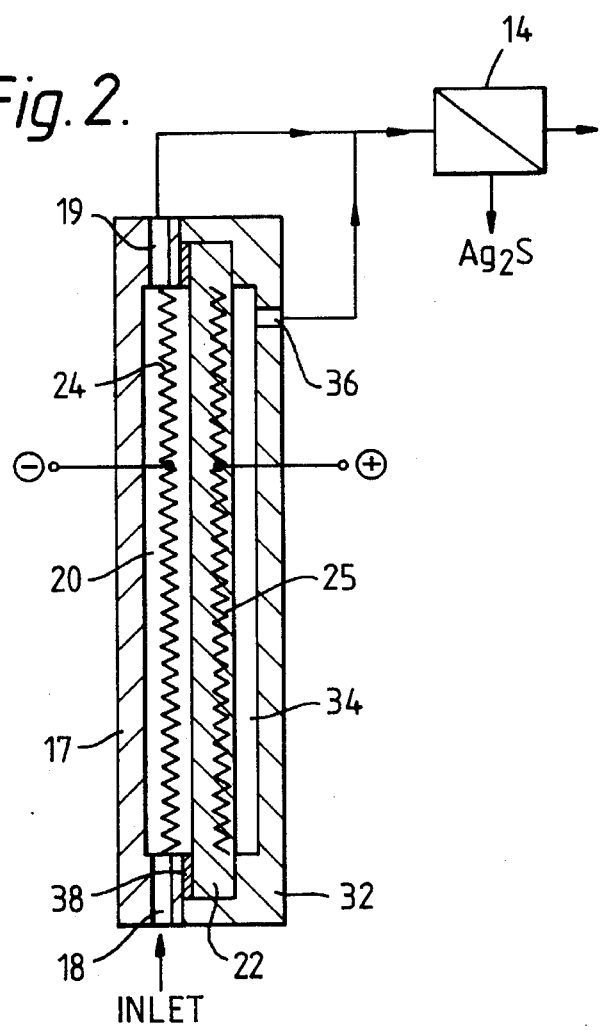
FIG. 2 shows a cross-sectional view of a modification of the apparatus of FIG. 1.

Referring now to FIG. 2 there is shown a modification of the cell 12 of FIG. 1. As with the cell 12 there is a flow path 20 between an inlet 18 and an outlet 19, a cathode 24 supported in the flow path 20, the flow path 20 being defined between a casing part 17 and the front face of a permeable layer 22 of particulate ion exchange material, and an anode 25 is embedded in the layer 22 next to its rear surface. In this case the casing part 32 in which the layer 22 locates also defines an eluate chamber 34 adjacent the rear surface of the layer 22, with an eluate outlet port 36. Furthermore the layer 22 is sealed to the casing parts 17 and 32 by a gasket 38 around its edge.

The cell of FIG. 2 operates in substantially the same way as that of FIG. 1. Water permeating the layer 22 fills the eluate chamber 34, which becomes acidic due to electrolysis of water at the anode 25. Some silver thiosulphate complex anions migrate through the layer 22, and precipitate as silver sulphide in the acidic liquid in the chamber 34. The liquid emerging from the flow path 20 is alkaline due to the cathodic reaction, but this is mixed with acidic liquid from the eluate outlet port 36, so the resultant liquid is of pH 6.5 approximately. Precipitated silver sulphide is separated from the mixed liquids by a filter 14.

It will be appreciated that a liquid treatment apparatus can differ from those described above while remaining within the scope of the invention. For example the filter 14 might be replaced by a different separating means such as a cyclone. The cells may be of different dimensions, and the layer 22 might be of a different thickness and of a different anion-selective material.

A further modification of the cell 12 differs from that shown in FIG. 2 only in that the chamber 34 adjacent the rear face of the layer 22 is provided with two ports 36 at opposite ends of the chamber 34 (instead of just one port 36). Using such a cell, the flow path for the liquid to be treated is also different, the liquid being caused to flow firstly through the chamber 34, and then to flow through the flow path 20, and so on to the filter 14.

During its passage through the chamber 34 the liquid becomes acidic, and furthermore Some oxidation of thiosulphate ions to sulphate occurs (either directly, or as a consequence of oxidation of chloride or bromide ions). As a result of the decrease in pH, some of the thiosulphate ions will decompose as described earlier. Both these processes significantly decrease the concentration of thiosulphate ions. The resulting acidic liquid then passes through the flow path 20 where the reactions described earlier occur, producing precipitated particles of silver sulphide, and returning the pH to near neutral. The overall process has been found to be considerably more efficient, as competing reactions with thiosulphate ions are suppressed.

We claim:

1. A method of treating a liquid containing silver and thiosulphate ions, the method comprising causing the liquid to flow through an electrochemical cell, the cell comprising a cathode, an anode, and a barrier to impede at least partially transfer of the liquid from the vicinity of the cathode to the vicinity of the anode, the barrier being permeable at least to anions, substantially all the liquid being caused to flow in the vicinity of the cathode, applying a potential difference between the anode and the cathode, and separating silver sulphide precipitates from the liquid after its passage through the cell, liquid from the vicinity of the anode being subjected to an operation selected from the group consisting of (a) being mixed with liquid which has flowed in the vicinity of the cathode, prior to separation of the precipitates, and (b) being supplied to the vicinity of the cathode.

2. A method as claimed in claim 1 wherein all the liquid is caused to flow in the vicinity of the anode and then to flow in the vicinity of the cathode.

3. A method as claimed in claim 1 wherein the barrier is an inert, water-permeable, mechanical barrier.

4. A method as claimed in claim 1 wherein the barrier is an anion-selective electrodialysis membrane substantially impermeable to water.

5. A method as claimed in claim 1 wherein the barrier comprises a layer of particulate anion-exchange material bound together by a binder to form a water-permeable coherent structure.

6. A method as claimed in claim 5 wherein the barrier layer is of thickness between 2 and 50 mm, of permeability in the range 25 to 150 liters $m^{-2}h^{-1}$, and formed of particulate anion-exchange material of particle size in the range 50 µm to 2 mm with a binder which does not fill the interstices.

7. A method as claimed in claim 5 wherein the anode is embedded in the barrier layer adjacent to the surface of the layer remote from the cathode.

8. An apparatus for removing silver from a liquid containing silver and thiosulphate ions comprising an electrochemical cell comprising a cathode, an anode, and a barrier to impede at least partially transfer of the liquid from the vicinity of the cathode to the vicinity of the anode, the barrier being permeable at least to anions, means to cause the liquid to flow through the cell, substantially all the liquid flowing in the vicinity of the cathode, means to separate silver sulphide precipitates from the liquid after its passage through the cell, and means to subject liquid from the vicinity of the anode to an operation selected from the group consisting of (a) being mixed with liquid which has flowed in the vicinity of the cathode, prior to separation of the precipitates, and (b) being supplied to the vicinity of the cathode.

9. An apparatus as claimed in claim 8 wherein the barrier comprises a layer of particulate anion-exchange material bound together by a binder to form a water-permeable coherent structure.

* * * * *